United States Patent [19]

Wald

[11] Patent Number: 5,455,334
[45] Date of Patent: Oct. 3, 1995

[54] SULFONAMIDO-PHTHALOCYANINE AZO FIBRE-REACTIVE DYESTUFFS CONTAINING A HETEROCYCLIC FIBRE-REACTIVE GROUP

[76] Inventor: Roland Wald, 10, rue Wilson, F-68330 Huningue, France

[21] Appl. No.: 196,616

[22] Filed: Feb. 10, 1994

[30] Foreign Application Priority Data

Feb. 12, 1993 [DE] Germany ............... 43 04 242.2

[51] Int. Cl.$^6$ ............. C09B 62/026; C09B 62/036; D06P 1/382
[52] U.S. Cl. ............. 534/624; 534/622; 534/627; 534/628
[58] Field of Search ............. 534/622, 624, 534/627, 628; 540/125, 126

[56] References Cited

U.S. PATENT DOCUMENTS

| | | | |
|---|---|---|---|
| 3,674,783 | 7/1972 | Von Tobel | 534/627 X |
| 3,752,801 | 8/1973 | Hoelzle et al. | 534/627 X |
| 4,204,056 | 5/1980 | Muller et al. | 534/627 X |
| 4,900,812 | 2/1990 | Moser et al. | 534/627 |
| 5,051,501 | 9/1991 | Schundehutte et al. | 540/125 |
| 5,070,193 | 12/1991 | Schundehutte et al. | 540/125 |
| 5,340,928 | 8/1994 | Hoppe et al. | 534/618 |

FOREIGN PATENT DOCUMENTS

| | | |
|---|---|---|
| 0097119 | 12/1983 | European Pat. Off. . |
| 0513622 | 11/1992 | European Pat. Off. . |
| 61-87759 | 5/1986 | Japan ............. 540/126 |
| 2200364 | 8/1988 | United Kingdom . |
| 2219804 | 12/1989 | United Kingdom . |

OTHER PUBLICATIONS

*Dyes and Pigments*, vol. 14, No. 4, F. Lehr, *Synthesis and Application of Reactive Dyes with Heterocyclic Reactive Systems*, pp. 239–263 (1990).

*Primary Examiner*—Roger W. Ramsuer
*Assistant Examiner*—Fiona T. Powers
*Attorney, Agent, or Firm*—Robert S. Honor; Carl W. Battle; Carol A. Loeschorn

[57] ABSTRACT

Phthalocyanine compounds which contain a heterocyclic fibre-reactive radical correspond to the formula

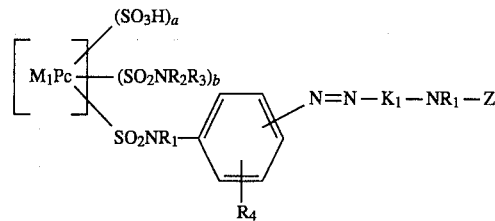

in which the symbols are as defined in the specification, which compounds are in free acid or salt form, and mixtures thereof, are useful for dyeing or printing hydroxy group- or nitrogen-containing organic substrates, for example leather and fibre material comprising natural or synthetic polyamides or natural or regenerated cellulose; the most preferred substrate is a textile material comprising cotton.

10 Claims, No Drawings

SULFONAMIDO-PHTHALOCYANINE AZO FIBRE-REACTIVE DYESTUFFS CONTAINING A HETEROCYCLIC FIBRE-REACTIVE GROUP

This invention relates to phthalocyanine compounds which contain a heterocyclic fibre-reactive radical and a process for their production. These compounds are suitable as fibre-reactive dyestuffs in any conventional dyeing or printing processes.

More particularly, the invention provides compounds of formula I

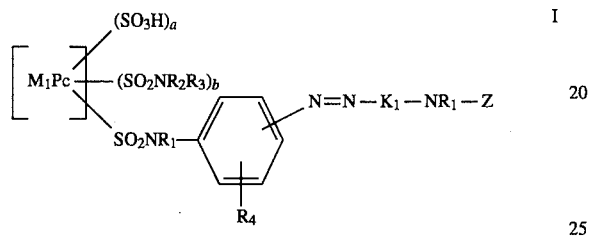

and salts thereof, or a mixture of such compounds or salts, in which $Pc$ is the phthalocyanine radical, $M_1$ is Cu, Ni, Co, Fe or Al;

$a$ is 1, 2 or 3, $b$ is 0, 1 or 2, provided that the sum of $a$ and $b$ is a maximum of 3;

each $R_1$ is independently hydrogen, unsubstituted $C_{1-4}$alkyl or $C_{1-4}$alkyl monosubstituted by hydroxy, halogen, —$SO_3H$, —$OSO_3H$ or —COOH, each of $R_2$ and $R_3$ is independently hydrogen or $C_{1-6}$alkyl, or $R_2$ and $R_3$ together form a $C_{4,5}$alkylene chain which may be interrupted by —O— or —NH—, $R_4$ is hydrogen, halogen, hydroxy, $C_{1-4}$alkyl, $C_{1-4}$alkoxy, —COOH or —$SO_3H$, Z is

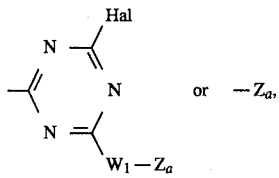 or —$Z_a$,

Hal is fluoro or chloro, $Z_a$ is a fluoro-containing pyrimidinyl radical of the formulae

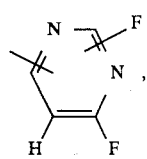 (a)

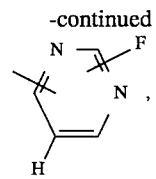 (b)

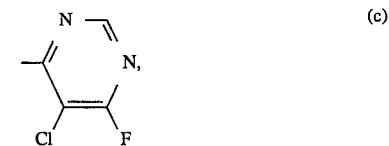 (c)

$W_1$ is

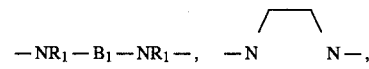

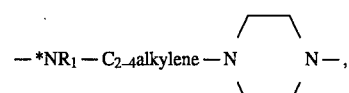

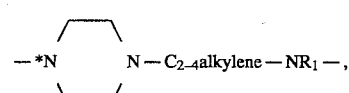

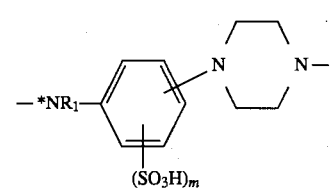

or

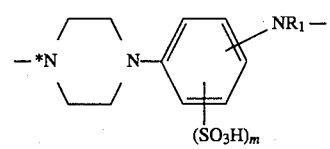

in which $m$ is 0 or 1, and the marked nitrogen atom is attached to a carbon atom of the triazine ring, $B_1$ is $C_{2-4}$alkylene; -$C_{2-3}$alkylene-Q-$C_{2-3}$alkylene- in which Q is —O— or —$NR_1$—; $C_{3-4}$alkylene monosubstituted by hydroxy;

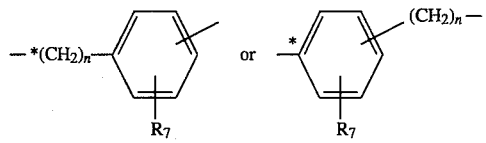

in which the marked carbon atom is attached to the —$NR_1$-radical which is bound to a carbon atom of the triazine ring, $n$ is 0 or an integer 1 to 4, and each $R_7$ is independently hydrogen, halogen, $C_{1-4}$alkyl, $C_{1-4}$alkoxy, —COOH or —$SO_3H$;

$K_1$ is

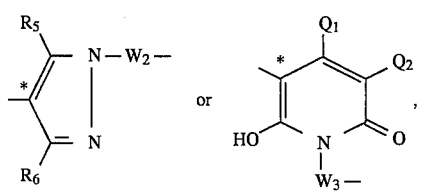

in which the marked carbon atom indicates the coupling position, $R_5$ is —OH or —NH$_2$, $R_6$ is $C_{1-4}$alkyl or —COR$_8$, each $R_8$ is independently —OH, —OC$_{1-4}$alkyl or —NH$_2$, $W_2$ is a divalent bridging group, $Q_1$ is hydrogen; $C_{1-4}$alkyl; $C_{5-6}$cycloalkyl; phenyl or phenyl which is substituted by 1 to 3 substituents selected from $C_{1-4}$alkyl, $C_{1-4}$alkoxy, halogen, —COOH and —SO$_3$H; phenyl($C_{1-4}$alkyl) or phenyl($C_{1-4}$alkyl) the phenyl ring of which is substituted by 1 to 3 substituents selected from $C_{1-4}$alkyl, $C_{1-4}$alkoxy, halogen, —COOH and —SO$_3$H; —COR$_8$; —C$_{1-4}$alkylene-SO$_3$H; —C$_{1-4}$alkylene-OSO$_3$H or —C$_{1-4}$alkylene-COR$_8$, $Q_2$ is hydrogen; —CN; —SO$_3$H; —COR$_8$; $C_{1-4}$alkyl; $C_{1-4}$alkyl monosubstituted by —OH, halogen, —CN, $C_{1-4}$alkoxy,

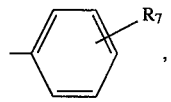

SO$_3$H, —OSO$_3$H or —NH$_2$; —SO$_2$NH$_2$;

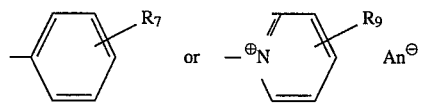

in which
$R_7$ is as defined above,
$R_9$ is hydrogen, $C_{1-4}$alkyl or $C_{2-4}$hydroxyalkyl and
An$^\ominus$ is a non-chromophoric anion; and $W_3$ has one of the significances of $B_1$, but independent thereof, in which the marked carbon atom is attached to the nitrogen atom of the pyridone ring, or —W$_3$—NR$_1$—Z is

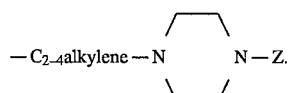

In the specification, any alkyl, alkoxy or alkylene group present is linear or branched unless indicated otherwise. In any hydroxysubstituted alkyl or alkylene group which is attached to a nitrogen atom, the hydroxy group is preferably bound to a carbon atom which is not directly attached to the nitrogen atom. In any alkylene chain interrupted by Q which is attached to a nitrogen atom, Q is preferably bound to a carbon atom which is not directly attached to the nitrogen atom.

$M_1$ is preferably Cu, Ni or Al most preferably it is Cu or Ni.

Any halogen is preferably fluorine, chlorine or bromine; more preferably it is chlorine or bromine and most preferably it is chlorine.

Any alkyl as $R_1$ preferably contains 1 or 2 carbon atoms. Any substituted alkyl as $R_1$ is preferably a $C_{1-3}$alkyl group which is preferably monosubstituted by hydroxy, —SO$_3$H, —OSO$_3$H or —COOH; most preferably it is $C_{2-3}$hydroxyalkyl.

Each $R_1$ is preferably $R_{1a}$, where each $R_{1a}$ is independently hydrogen, methyl, ethyl, $C_{2-3}$hydroxyalkyl, —(CH$_2$)$_p$SO$_3$H, —(CH$_2$)$_p$OSO$_3$H or —(CH$_2$)$_q$COOH in which p is 1 or 2 and q is 1, 2 or 3.

More preferably each $R_1$ is $R_{1b}$, where each $R_{1b}$ is independently hydrogen, methyl, ethyl or 2-hydroxyethyl. Most preferably each $R_1$ is $R_{1c}$, where each $R_{1c}$ is independently hydrogen or methyl.

Any alkyl as $R_2$ and $R_3$ is preferably a $C_{1-4}$alkyl group, especially methyl or ethyl. Any alkylene chain as $R_2$ and $R_3$ which may be interrupted by —O— or —NH—, together with the nitrogen atom to which $R_2$ and $R_3$ are bound preferably forms a pyrrolidine-, piperidine-, morpholine- or piperazine-ring.

Each of $R_2$ and $R_3$ is preferably $R_{2a}$ and $R_{3a}$, where each of $R_{2a}$ and $R_{3a}$ is independently hydrogen or $C_{1-4}$alkyl; or $R_{2a}$ and $R_{3a}$ together with the nitrogen atom to which they are bound form a pyrrolidine-, piperidine-, morpholine- or piperazine-ring. More preferably each of $R_2$ and $R_3$ is $R_{2b}$ and $R_{3b}$, where each of $R_{2b}$ and $R_{3b}$ is independently hydrogen, methyl or ethyl.

$R_4$ is preferably $R_{4a}$, where $R_{4a}$ is hydrogen, methyl, methoxy, —COOH or —SO$_3$H. More preferably it is $R_{4b}$, where $R_{4b}$ is hydrogen, —COOH or —SO$_3$H.

Each $R_7$ is preferably $R_{7a}$, where each $R_{7a}$ is independently hydrogen, chloro, methyl, methoxy, —COOH or —SO$_3$H. More preferably each $R_7$ is $R_{7b}$, where each $R_{7b}$ is independently hydrogen or —SO$_3$H.

$B_1$ is preferably $B_{1a}$, where $B_{1a}$ is $C_{2-3}$alkylene, —CH$_2$CH$_2$—NR$_{1b}$-CH$_2$CH$_2$—, monohydroxy-substituted $C_{3-4}$alkylene,

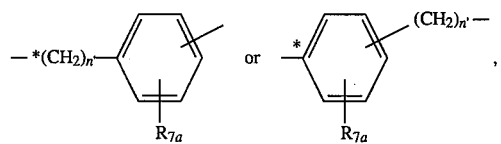

in which n' is 0 or 1.

More preferably $B_1$ is $B_{1b}$, where $B_{1b}$ is $C_{2-3}$alkylene, —CH$_2$CH$_2$—NR$_{1b}$—CH$_2$ CH$_2$—, —CH$_2$CH(OH)CH$_2$— or

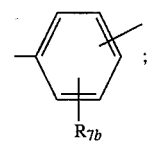

Most preferably $B_1$ is $B_{1c}$, where $B_{1c}$ is —CH$_2$CH$_2$—, —CH$_2$CH$_2$CH$_2$—, —*CH$_2$CH(CH$_3$) or —CH$_2$CH(OH)CH$_2$—, wherein the marked carbon atom is bound to the —NR$_1$-radical which is attached to a carbon atom of the triazine ring.

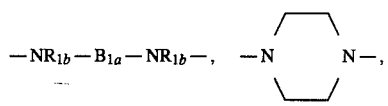

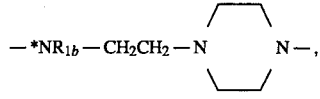

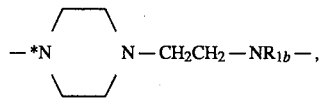

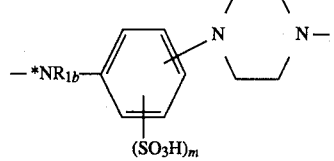

or

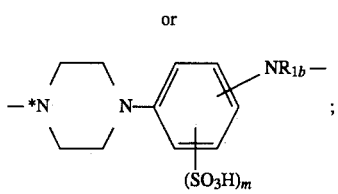

more preferably it is $W_{1b}$, where $W_{1b}$ is $-NR_{1b}-B_{1b}-NR_{1b}-$ or

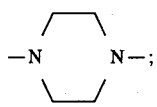

most preferably it is $W_{1c}$, where $W_{1c}$ is $-NH-B_{1c}-NH-$.

When $Z_a$ is a radical (b) this is preferably a radical ($b_1$) or ($b_2$) of the formulae

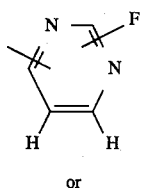
(b₁)

or

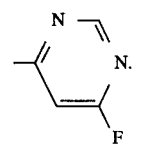
(b₂)

$Z_a$ is preferably $Z_b$, where $Z_b$ is a radical (a), ($b_1$), ($b_2$) or (c); most preferably it is $Z_c$, where $Z_c$ is a radical (a).

Z is preferably Z', where Z' is

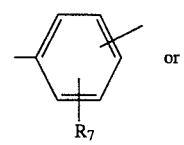
or $-Z_b$.

More preferably Z is Z", where Z" is

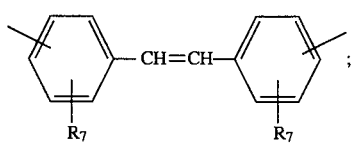
or $-Z_c$.

Most preferably Z is Z'", where Z'" is

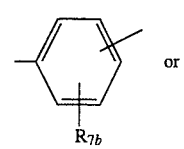
or $-Z_c$.

Hal in a radical Z is most preferably chloro.
$R_5$ is preferably —OH.
$R_6$ is preferably $R_{6a}$, where $R_{6a}$ is methyl, —COOH or —CONH₂.
Each $R_8$ is preferably $R_{8a}$, where each $R_8$ is independently —OH or —NH₂.
Any divalent bridging group $W_2$ is preferably an aromatic bridge, more preferably it is an unsubstituted or substituted phenylene or stilbene bridge.
$W_2$ is preferably $W_{2a}$, where $W_{2a}$ is more preferably $W_2$ is $W_{2b}$, where $W_{2b}$ is -continued

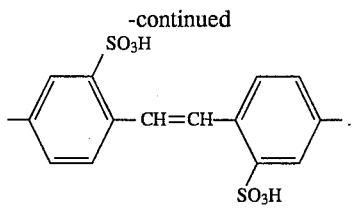

$Q_1$ is preferably $Q_{1a}$, where $Q_{1a}$ is hydrogen, methyl, ethyl, phenyl, —$COR_{8a}$, —$CH_2SO_3H$ or —$CH_2OSO_3H$; more preferably it is $Q_{1b}$, where $Q_{1b}$ is methyl or ethyl, especially methyl.

$Q_2$ is preferably $Q_{2a}$, where $Q_{2a}$ is hydrogen, —CN, —$SO_3H$, —$COR_{8a}$ or —$CH_2SO_3H$; more preferably it is $Q_{2b}$, where $Q_{2b}$ is hydrogen or —$CONH_2$; most preferably $Q_2$ is hydrogen.

$W_3$ is preferably $W_{3a}$, where $W_{3a}$ is $C_{2-4}$alkylene, monohydroxy-substituted $C_{3-4}$alkylene,

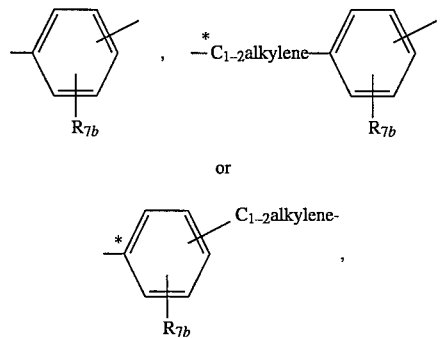

or $W_{3a}$ together with —$NR_1$—Z, to which $W_{3a}$ is attached, forms

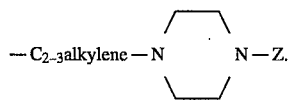

$K_1$ is preferably $K_{1a}$ of the formulae

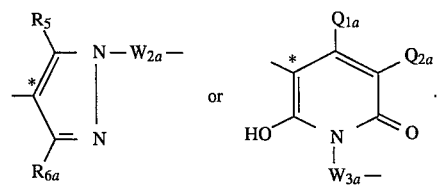

More preferably $K_1$ is $K_{1b}$ of the formulae

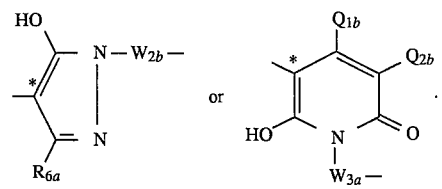

Most preferably $K_1$ is $K_{1c}$, where $K_{1c}$ has the formula

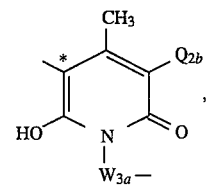

in which $Q_{2b}$ is most preferably hydrogen.

Preferred compounds of formula I correspond to formula Ia

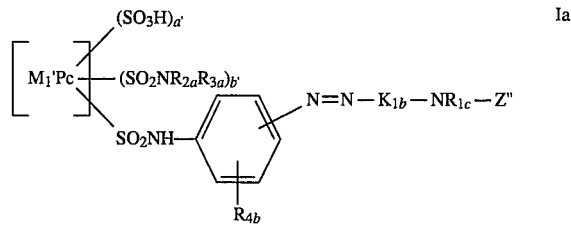

and salts thereof, or a mixture of such compounds or salts, in which $M_1'$ is Cu or Ni, a' is 2 or 3, b' is 0 or 1, provided that the sum of a' and b' is a maximum of 3.

More preferred compounds of formula Ia and mixtures thereof are those in which (1) a' is 2 or 3 and b' is 0;

(2) $K_{1b}$ is $K_{1c}$;

(3) those of (1) or (2), in which Z" is Z'".

When a compound of formula I is in salt form, the cation associated with the sulpho groups and any carboxy group is not critical and may be any one of those non-chromophoric cations conventional in the field of fibre-reactive dyes provided that the corresponding salts are water-soluble. Examples of such cations are alkali metal cations and unsubstituted and substituted ammonium cations, e.g., lithium, sodium, potassium, ammonium, mono-, di-, tri- and tetra-methylammonium, tri-ethylammonium and mono-, di- and tri- ethanolammonium.

The preferred cations are the alkali metal cations and ammonium, with sodium being the most preferred.

In a compound of formula I the cations of the sulpho and any carboxy groups can be the same or different, e.g., they can also be a mixture of the above mentioned cations meaning that the compound of formula I can be in a mixed salt form.

Any $An^{\ominus}$ present to balance the positive charge of the pyridinium ion defined in $Q_2$, can be any conventional non-chromophoric organic or inorganic anion; most preferably it is chloride, acetate or methyl sulphate.

The invention further provides a process for the preparation of compounds of formula I or mixtures thereof, comprising reacting a compound of formula II,

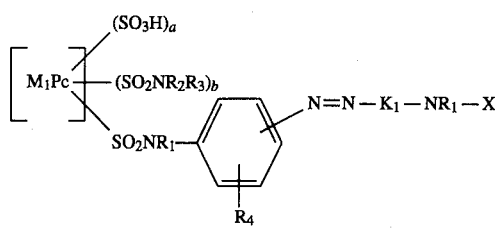

II in which the symbols are as defined above and X is hydrogen or

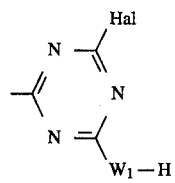

wherein Hal and $W_1$ are as defined above, or a mixture of compounds of formula II with a compound $Z_a$—$Hal_1$ in which $Z_a$ is as defined above and $Hal_1$ is fluoro or chloro.

The condensation of a compound of formula II with a compound $Z_a$—$Hal_1$ is suitably carried out at a slightly elevated temperature in the range of from 20°–50° C., preferably at 30°–40° C., and at a pH of 6.0–7.5; normally, water is used as reaction medium.

The compounds of formula I may be isolated in accordance with known methods, for example, by conventional salting out with alkali metal salt, filtering and drying optionally in vacuo and at slightly elevated temperatures.

Depending on the reaction and isolation conditions, a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

It should be noted that the reaction of any amino-containing chromophore with difluoro- or trifluoro-pyrimidine yields two position isomers; due to the fact that the exchange of fluorine is not selective, any radical (a) or ($b_1$)

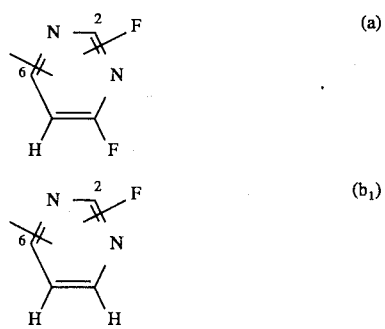

present as $Z_a$ can occur in two isomeric forms, with the floating fluoro substituent in either the 2- or 6-position.

Preferably, the compounds of formula I are mixtures. These mixtures contain position isomers which can differ on the one hand by the position of any floating substituent on the phthalocyanine radical, and on the other hand by the position of the floating fluoro substituent present in $Z_a$.

In general, it is preferred to use this mixture of resulting dyestuffs as it is without resorting to the isolation of a single isomer for use, but should this be desired it can be readily achieved by conventional methods.

The starting compounds of formula II and $Z_a$—$Hal_1$ are either known or may be readily made from known starting materials by known methods.

The compounds of formula I and mixtures thereof are useful as fibre-reactive dyestuffs for dyeing or printing hydroxy group- or nitrogen-containing organic substrates. Preferred substrates are leather and fibre material comprising natural or synthetic polyamides and, particularly, natural or regenerated cellulose such as cotton, viscose and spun rayon. The most preferred substrate is textile material comprising cotton.

Dyeing or printing is effected in accordance with known methods conventional in the fibre-reactive dyestuff field. Preferably, for the compounds of formula I the exhaust dyeing method is used at temperatures within the range of from 30° to 100° C., particularly at 50°–60° C. and 80°–100° C., respectively, whereby a liquor to goods ratio of 4:1 to 3 and more preferably of 6:1 to 20:1.

The compounds of this invention have good compatibility with known fibre-reactive dyes; they may be applied alone or in combination with appropriate fibre-reactive dyestuffs of the same class having analogous dyeing properties such as common fastness properties and the extent of ability to exhaust from the dyebath onto the fibre. The dyeings obtained with such combination mixtures have good fastness properties and are comparable to those obtained with a single dyestuff.

The compounds of formula I give good exhaust and fixation yields when used as dyestuffs. Moreover, any unfixed compound is easily washed off the substrate. The dyeings and prints derived from the compounds of formula I exhibit good light fastness and good wet fastness properties such as wash, water, sea water and sweat fastness. They also exhibit good resistance to oxidation agents such as chlorinated water, hypochlorite bleach, peroxide bleach and perborate-containing washing detergents.

In particular, the dyeings obtained on cellulose textile material with the compounds according to the invention show improved washing fastness with respect to domestic laundering which is superior to that of the corresponding dyeings made with fibre-reactive dyestuffs of the state of the art containing a different halopyrimidine radical.

The following examples illustrate the invention. In the examples all parts and percentages are by weight unless indicated to the contrary, and all temperatures are given in degrees Centigrade.

EXAMPLE 1

25.5 Parts (0.025 moles) of a nickel phthalocyanine dyestuff base compound containing on average 2.5 sulphonic acid groups and 1 sulphamide group per molecule which has been produced in accordance with a conventional method by sulphochlorinating nickel phthalocyanine and subsequently reacting with 1,3-diaminobenzene-4-sulphonic acid, are mixed with 1.8 parts of sodium nitrite by stirring in 150 parts of water. The solution is cooled to 0°–2° and is added dropwise to a mixture of 100 parts of ice/water and 12 parts by volume of 30% hydrochloric acid. The diazonium salt suspension obtained is kept at a temperature of 0°–5° and is passed into a solution consisting of 300 parts of ice/water and 5.9 parts of 1-(3-methylaminopropyl)-6-hydroxy-4-methylpyridoneo-(2). During the coupling reaction, the pH is maintained at 6.5–7.5 by adding 20% sodium hydroxide solution. To the resultant green solution, 4 parts of 2,4,6-trifluoropyrimidine are added at 20°–25°. During the reaction, the pH is kept at 6.5–7.0 by the continuous addition of 20% sodium carbonate solution. The reaction temperature afterwards is raised to 40° and kept till the end of the reaction. After 3–4 hours, the reaction is complete. The reaction mixture is salted out with sodium chloride and the dyestuff precipitated is filtered off and dried at 40°. The dyestuff has the formula

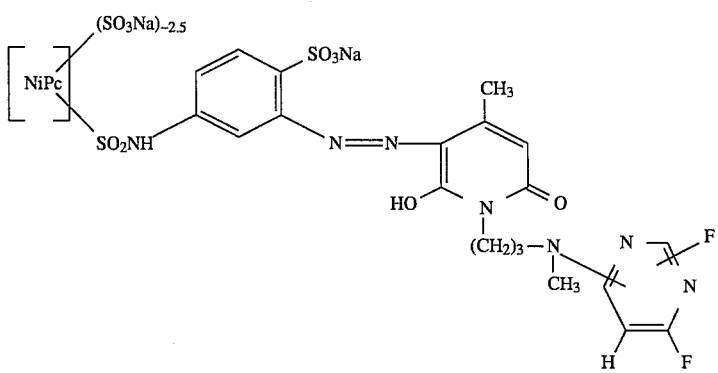

and dyes cellulose material, especially cotton, in brilliant green shades. These dyeings exhibit good light fastness and excellent wet fastness properties.

EXAMPLE 2

By using instead of the 25.5 parts of nickel phthalocyanine dyestuff base compound of Example 1, an equivalent amount of aluminium phthalocyanine dyestuff base compound having 2.5 sulphonic acid groups and 1 sulphamide group per molecule, i.e. 24.8 parts, the aluminium analogue of the phthalocyanine dyestuff of formula (1) is obtained which dyes cotton a green shade. These dyeings exhibit good wet fastness properties.

EXAMPLES 3–42

By analogy with the method described in Example 1, usind appropriate starting materials, further phthalocyanine compounds of formula I can be prepared which are listed in the following Tables 1 and 2. They correspond (in free acid form) to the formulae (T1) and (T2)

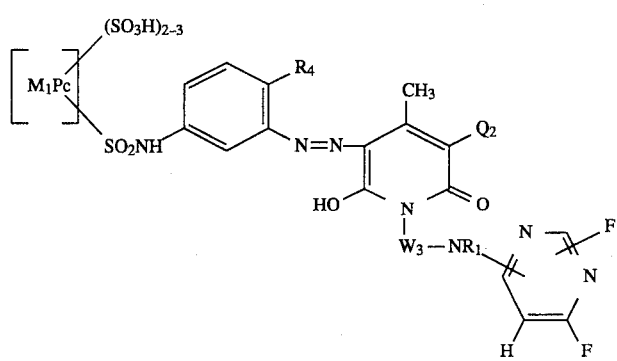
(T1)

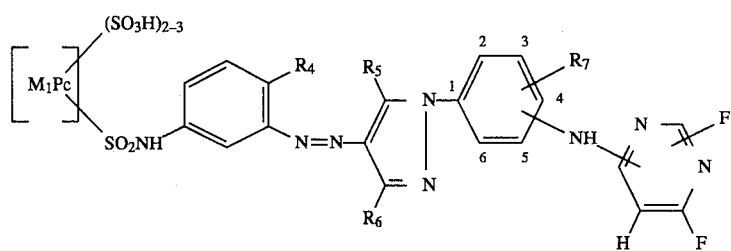
(T2)

in which the symbols are as defined in the tables.

The compounds of Examples 3 to 42 may be applied to substrates which comprise cellulose fibres, and particularly to textile material comprising cotton, using the conventional exhaust dyeing method or conventional printing processes. Green dyeings (of high fixation values) or prints are obtained which exhibit good fastness properties, such as good light fastness and good wet fastnesses. Those dyestuffs in which $M_1$ is nickel give cotton dyeings of a particularly brilliant green shade.

TABLE 1

Compounds of formula (T1) Examples 3–23

| Ex. No. | $M_1$ | $R_4$ | $Q_2$ | $-W_3-NR_1-$ |
|---|---|---|---|---|
| 3 | Cu | H | H | $-(CH_2)_3N-$<br>$\quad\quad\quad\;\;\;\mid$<br>$\quad\quad\quad\;\;\;CH_3$ |
| 4 | Cu | $SO_3H$ | H | $-(CH_2)_3N-$<br>$\quad\quad\quad\;\;\;\mid$<br>$\quad\quad\quad\;\;\;CH_3$ |
| 5 | Cu | " | $-CONH_2$ | $-(CH_2)_3N-$<br>$\quad\quad\quad\;\;\;\mid$<br>$\quad\quad\quad\;\;\;CH_3$ |
| 6 | Cu | H | CN | $-(CH_2)_3N-$<br>$\quad\quad\quad\;\;\;\mid$<br>$\quad\quad\quad\;\;\;CH_3$ |
| 7 | Ni | H | H | $-(CH_2)_3N-$<br>$\quad\quad\quad\;\;\;\mid$<br>$\quad\quad\quad\;\;\;CH_3$ |
| 8 | Ni | H | $-\overset{\oplus}{N}\diagdown\;\;Cl^{\ominus}$ (pyridinium) | $-(CH_2)_3N-$<br>$\quad\quad\quad\;\;\;\mid$<br>$\quad\quad\quad\;\;\;CH_3$ |
| 9 | Ni | H | $-CONH_2$ | $-(CH_2)_3N-$<br>$\quad\quad\quad\;\;\;\mid$<br>$\quad\quad\quad\;\;\;CH_3$ |

TABLE 1-continued

Compounds of formula (T1) Examples 3–23

| Ex. No. | $M_1$ | $R_4$ | $Q_2$ | $-W_3-NR_1-$ |
|---|---|---|---|---|
| 10 | Ni | $SO_3H$ | " | $-(CH_2)_3N-$<br>$\quad\quad\quad\;\;\;\mid$<br>$\quad\quad\quad\;\;\;CH_3$ |
| 11 | Ni | H | CN | $-(CH_2)_3N-$<br>$\quad\quad\quad\;\;\;\mid$<br>$\quad\quad\quad\;\;\;CH_3$ |
| 12 | Ni | $SO_3H$ | $-CONH_2$ | $-(CH_2)_2NH-$ |
| 13 | Ni | " | H | " |
| 14 | Cu | " | H | " |
| 15 | Ni | H | H | " |
| 16 | Cu | H | H | " |
| 17 | Ni | H | H | $-(CH_2)_2N\diagup\diagdown N-$ (piperazine) |
| 18 | Ni | $SO_3H$ | H | $-(CH_2)_2N\diagup\diagdown N-$ |
| 19 | Ni | " | $-CONH_2$ | $-(CH_2)_2N\diagup\diagdown N-$ |
| 20 | Ni | " | " | $-(CH_2)_3NH-$ |
| 21 | Cu | H | " | " |
| 22 | Ni | $SO_3H$ | H | " |
| 23 | Ni | " | H | $-(CH_2)_2N-$<br>$\quad\quad\quad\;\;\;\mid$<br>$\quad\quad\quad\;\;\;C_2H_5$ |

TABLE 2

Compounds of formula (T2)
Examples 24–42

| Ex.No. | $M_1$ | $R_4$ | $R_5$ | $R_6$ | $R_7$ (position) | position of —NH— |
|---|---|---|---|---|---|---|
| 24 | Cu | $SO_3H$ | OH | $CH_3$ | H | 3 |
| 25 | Al | " | OH | " | H | 3 |
| 26 | Cu | H | OH | " | 2-$SO_3H$ | 5 |
| 27 | Cu | $SO_3H$ | OH | " | " | 5 |
| 28 | Cu | " | OH | COOH | H | 3 |
| 29 | Cu | " | $NH_2$ | $CH_3$ | H | 3 |
| 30 | Ni | " | OH | " | H | 3 |
| 31 | Ni | H | OH | " | 2-$SO_3H$ | 5 |
| 32 | Ni | $SO_3H$ | OH | " | " | 5 |
| 33 | Ni | " | OH | COOH | H | 4 |
| 34 | Ni | " | $NH_2$ | $CH_3$ | H | 3 |
| 35 | Ni | " | " | " | 2-$SO_3H$ | 5 |
| 36 | Ni | " | " | " | H | 4 |
| 37 | Ni | " | OH | COOH | H | 3 |
| 38 | Ni | " | OH | $CH_3$ | 2-$SO_3H$ | 4 |
| 39 | Ni | " | OH | " | H | 4 |
| 40 | Ni | H | OH | COOH | H | 3 |
| 41 | Cu | H | OH | $CH_3$ | H | 4 |
| 42 | Ni | H | OH | " | H | 3 |

EXAMPLE 43

By analogy with the method described in Example 1, using appropriate starting compounds, the dyestuff which (in free acid form) corresponds to the formula

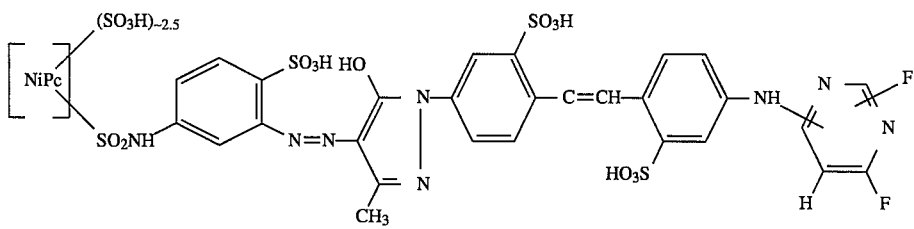

can be produced and isolated. With this dyestuff, brilliant green dyeings on cotton are obtained which show good light fastness and wet fastness properties.

EXAMPLE 44

5 Parts of cyanuric chloride are stirred into a mixture of 10 parts of water and 20 parts of ice to yield a homogeneous suspension. A neutral solution (of pH 7) of 34 parts of the sodium salt of the dyestuff of formula (44a)

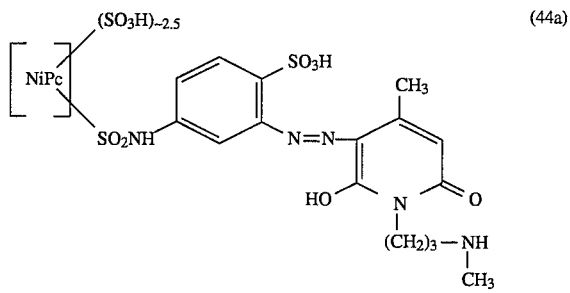

in 250 parts of water are added thereto, and stirring is effected at 20°–25° and pH 6.0–6.5 until the reaction of the secondary amino group is complete. At a pH of 6.5–7.0, the temperature of the reaction mixture is slowly raised to 35°, and subsequently 2.9 parts of 1,2-diaminopropane are added. The pH is kept at 50° for three hours, after this time any starting compound is no longer detectable. 100 Parts of sodium chloride are then added and the green suspension is filtered. The filter cake is washed with 500 parts by volume of 10% sodium chloride solution. The paste thus obtained is brought into 600 parts of water, and 4 parts of 2,4,6-trifluoropyrimidine are added thereto. Stirring is effected for four hours at 35°–40° and pH 6.5–7.0 until the reaction is complete. Subsequently, sodium chloride is added and the dyestuff which precipitates is filtered; it corresponds (in free acid form) to formula (44b)

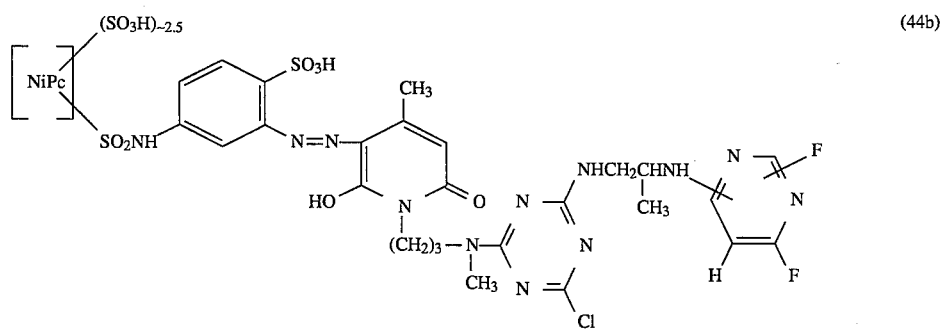

and dyes cellulosic textile material and especially cotton a brilliant green shade. These dyeings have high light fastness and perfect wet fastness properties.

EXAMPLES 45–81

By analogy with the method described in Example 1 or 44, using appropriate starting compounds, further compounds of formula I can be produced. They correspond (in free acid form) to formula (T3)

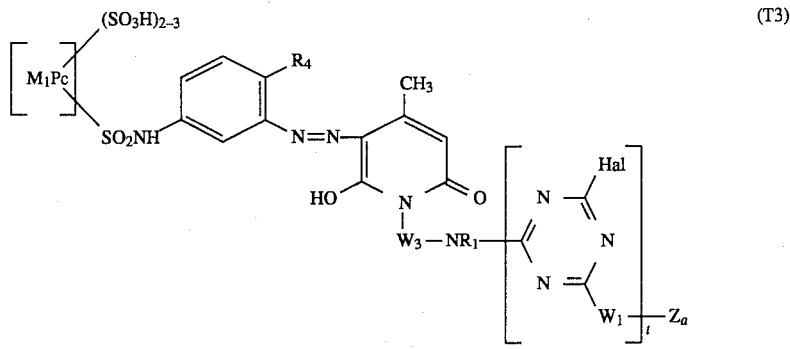
(T3)

in which the symbols are as defined in the following Table 3. In addition, the following symbols are used under column $Z_a$ of Table 3:

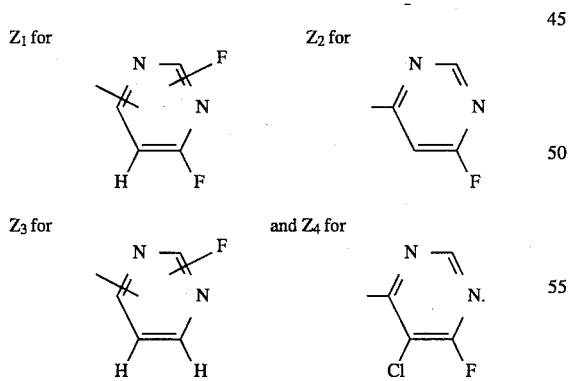

Under the column —$W_1$— of Table 3, the marked nitrogen atom is bound to a carbon atom of the triazine ring.

The dyestuffs of Examples 45–81 give green dyeings on cotton which show good fastness properties. Those cotton dyeings made with a nickel phthalocyanine dyestuff are in addition of particularly brilliant green shade.

TABLE 3

| | | | Compounds of formula (T3) Examples 45–81 | | | | |
|---|---|---|---|---|---|---|---|
| Ex. No. | $M_1$ | $R_4$ | $-W_3-NR_1-$ | t | Hal | $-W_1-$ | $Z_a$ |
| 45 | Cu | $SO_3H$ | $-(CH_2)_3-N(CH_3)-$ | 1 | Cl | $-*NHCH_2CH(CH_3)NH-$ | $Z_1$ |
| 46 | Al | " | $-(CH_2)_3-N(CH_3)-$ | 1 | Cl | $-*NHCH_2CH(CH_3)NH-$ | $Z_1$ |
| 47 | Ni | " | $-(CH_2)_3-N(CH_3)-$ | 1 | F | $-*NHCH_2CH(CH_3)NH-$ | $Z_1$ |
| 48 | Ni | " | $-(CH_2)_3-N(CH_3)-$ | 1 | F | $-*NHCH_2CH(CH_3)NH-$ | $Z_2$ |
| 49 | Ni | H | $-(CH_2)_3-N(CH_3)-$ | 1 | Cl | $-NHCH_2CH(OH)CH_2NH-$ | $Z_1$ |
| 50 | Cu | H | $-(CH_2)_3-N(CH_3)-$ | 1 | F | $-NHCH_2CH(OH)CH_2NH-$ | $Z_4$ |
| 51 | Ni | $SO_3H$ | $-(CH_2)_3-N(CH_3)-$ | 1 | Cl | $-NHCH_2CH(OH)CH_2NH-$ | $Z_3$ |
| 52 | Cu | " | $-(CH_2)_3-N(CH_3)-$ | 1 | F | $-NHCH_2CH(OH)CH_2NH-$ | $Z_2$ |
| 53 | Cu | $SO_3H$ | $-(CH_2)_3-N(CH_3)-$ | 1 | Cl | $-N{\frown\frown}N-$ (piperazine) | $Z_1$ |
| 54 | Ni | " | $-(CH_2)_3-N(CH_3)-$ | 1 | F | $-N{\frown\frown}N-$ (piperazine) | $Z_1$ |
| 55 | Ni | $SO_3H$ | $-(CH_2)_3-N(CH_3)-$ | 0 | — | — | $Z_3$ |
| 56 | Cu | H | $-(CH_2)_3-N(CH_3)-$ | 0 | — | — | $Z_4$ |
| 57 | Cu | $SO_3H$ | $-(CH_2)_3-N(CH_3)-$ | 0 | — | — | $Z_2$ |
| 58 | Ni | " | $-(CH_2)_3-N(CH_3)-$ | 0 | — | — | $Z_4$ |
| 59 | Ni | " | $-(CH_2)_2-NH-$ | 0 | — | — | $Z_2$ |
| 60 | Ni | " | " | 0 | — | — | $Z_3$ |
| 61 | Cu | " | " | 0 | — | — | $Z_4$ |
| 62 | Cu | H | " | 0 | — | — | $Z_3$ |
| 63 | Ni | $SO_3H$ | " | 1 | Cl | $-N{\frown\frown}N-$ (piperazine) | $Z_1$ |
| 64 | Cu | H | " | 1 | F | $-N{\frown\frown}N-$ (piperazine) | $Z_2$ |

TABLE 3-continued

Compounds of formula (T3) Examples 45–81

| Ex. No. | $M_1$ | $R_4$ | $-W_3-NR_1-$ | t | Hal | $-W_1-$ | $Z_a$ |
|---|---|---|---|---|---|---|---|
| 65 | Ni | $SO_3H$ | " | 1 | F | $-N\underset{\phantom{x}}{\overset{\phantom{x}}{\diagup\hspace{-2pt}\diagdown}}N-$ (piperazine) | $Z_1$ |
| 66 | Ni | " | " | 1 | Cl | $-*NHCH_2\underset{CH_3}{\overset{|}{C}}HNH-$ | $Z_1$ |
| 67 | Cu | " | " | 1 | F | $-*NHCH_2\underset{CH_3}{\overset{|}{C}}HNH-$ | $Z_2$ |
| 68 | Cu | " | " | 1 | Cl | $-NHCH_2\underset{OH}{\overset{|}{C}}HCH_2NH-$ | $Z_1$ |
| 69 | Ni | " | " | 1 | F | $-NHCH_2\underset{OH}{\overset{|}{C}}HCH_2NH-$ | $Z_3$ |
| 70 | Ni | " | $-(CH_2)_2-N\underset{\phantom{x}}{\overset{\phantom{x}}{\diagup\hspace{-2pt}\diagdown}}N-$ | 0 | — | — | $Z_3$ |
| 71 | Cu | " | $-(CH_2)_2-N\underset{\phantom{x}}{\overset{\phantom{x}}{\diagup\hspace{-2pt}\diagdown}}N-$ | 0 | — | — | $Z_2$ |
| 72 | Cu | " | $-(CH_2)_2-N\underset{\phantom{x}}{\overset{\phantom{x}}{\diagup\hspace{-2pt}\diagdown}}N-$ | 1 | Cl | $-*NHCH_2\underset{CH_3}{\overset{|}{C}}HNH-$ | $Z_1$ |
| 73 | Ni | " | $-(CH_2)_3-NH-$ | 1 | Cl | $-*NHCH_2\underset{CH_3}{\overset{|}{C}}HNH-$ | $Z_1$ |
| 74 | Cu | " | " | 1 | F | $-*NHCH_2\underset{CH_3}{\overset{|}{C}}HNH-$ | $Z_1$ |
| 75 | Ni | $SO_3H$ | $-(CH_2)_3-NH-$ | 1 | Cl | $-*NHCH_2\underset{CH_3}{\overset{|}{C}}HNH-$ | $Z_2$ |
| 76 | Ni | " | " | 0 | — | — | $Z_4$ |
| 77 | Cu | " | " | 0 | — | — | $Z_3$ |
| 78 | Ni | " | " | 1 | F | $-NHCH_2\underset{OH}{\overset{|}{C}}HCH_2NH-$ | $Z_1$ |
| 79 | Cu | H | " | 1 | Cl | $-NHCH_2\underset{OH}{\overset{|}{C}}HCH_2NH-$ | $Z_1$ |
| 80 | Ni | $SO_3H$ | " | 1 | Cl | $-N\underset{\phantom{x}}{\overset{\phantom{x}}{\diagup\hspace{-2pt}\diagdown}}N-$ | $Z_3$ |
| 81 | Ni | " | " | 1 | F | $-N\underset{\phantom{x}}{\overset{\phantom{x}}{\diagup\hspace{-2pt}\diagdown}}N-$ | $Z_1$ |

By the preparation method described in Example 1 or 44, the compounds of Examples 1–81 are obtained in their sodium salt form. By changing the reaction or isolation conditions or by using other known methods, it is possible to produce the compounds in the form of free acids or in other salt forms or mixed salt forms which contain one or more of the cations mentioned hereinabove.

As already mentioned hereinbefore in the description, the exemplified dyestuffs (and the corresponding free acids and other salt forms) which contain a radical $Z_1$ or $Z_3$ contain two isomeric compounds regarding the radical

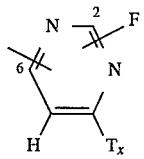

in which $T_x$ is hydrogen or fluoro; one compound in which the floating fluoro substituent on the pyrimidine ring is in the 2-position and the corresponding compound wherein it is in the 6-position.

In addition, the exemplified dyestuffs can also be a mixture of isomers regarding the substituents on the phthalocyanine ring thus containing isomers which differ with respect to the position of possibly floating substituents.

These mixtures of different isomeric dyestuffs may be used in any conventional dyeing or printing processes; the isolation of a single isomer for use normally is unnecessary.

In the following examples, the application of the compounds of this invention is illustrated.

Application Example A 0.3 Part of the dyestuff of Example 1 is dissolved in 100 parts of demineralised water and 8 parts of Glauber's salt (calcined) are added. The dyebath is heated to 50°, then 10 parts of cotton fabric (bleached) are added. After 30 minutes at 50°, 0.4 part of sodium carbonate (calcined) is added to the bath. During the addition of sodium carbonate the temperature is maintained at 50°. Subsequently, the dyebath is heated to 60°, and dyeing is effected for a further one hour at 60°.

The dyed fabric is then rinsed with running cold water for 3 minutes and afterwards with running hot water for a further 3 minutes. The dyeing is washed at the boil for 15 minutes in 500 parts of demineralised water in the presence of 0.25 part of Marseille soaps. After being rinsed with running hot water (for 3 minutes) and centrifuged, the dyeing is dried in a cabinet dryer at about 70°. A brilliant green cotton dyeing is obtained showing good fastness properties, and particularly high light fastness and wet fastness properties, which is stable towards oxidative influences.

Application Example B

To a dyebath containing in 100 parts of demineralised water 5 parts of Glauber's salt (calcined), 10 parts of cotton fabric (bleached) are added. The bath is heated to 50° within 10 minutes, and 0.5 part of the dyestuff of Example 1 is added. After a further 30 minutes at 50°, 1 part of sodium carbonate (calcined) is added. The dyebath is then heated to 60° and dyeing is continued at 60° for a further 45 minutes.

The dyed fabric is rinsed with running cold and then hot water and washed at the boil according to the method given in Application Example A. After rinsing and drying a brilliant green cotton dyeing is obtained which has the same good fastness properties as indicated in Application Example A.

Application Example C 2.5 Parts of the dyestuff of Example 55 are dissolved in 1000 parts of water. 100 Parts of cotton fabric are added to the dyebath, and the temperature is maintained at 80° over a period of 10 minutes. 50 Parts of Glauber's salt (calcined) are added to the dyebath followed by the addition 30 minutes later of 10 parts of sodium carbonate (calcined). Dyeing is continued for one hour at 80°. The dyed material is rinsed, washed and dried according to the procedure given in Application Example A. A brilliant green dyeing with good fastness properties is obtained.

Similarly, the dyestuffs of Examples 2–81 or mixtures of the exemplified dyestuffs may be employed to dye cotton in accordance with the method described in Application Examples A to C. The cotton dyeings thus obtained are green and show good fastness properties.

Application Example D

| |
|---|
| 40 parts of the dyestuff of Example 1 |
| 100 parts of urea |
| 350 parts of water |
| 500 parts of a 4% sodium alginate thickener and |
| 10 parts of sodium bicarbonate |
| 1000 parts in all | is applied to cotton fabric in accordance with conventional printing processes.

The printed fabric is dried and fixed in steam at 102°–104° for 4–8 minutes. It is rinsed in cold and then hot water, washed at the boil (according to the method described in Application Example A) and dried. A brilliant green print is obtained which has good general fastness properties.

Similarly, the dyestuffs of Examples 2–81 or mixtures of the exemplified dyestuffs may be employed to print cotton in accordance with the method given in Application Example D. All prints obtained are green and show good fastness properties.

What is claimed is:

1. A compound of formula I

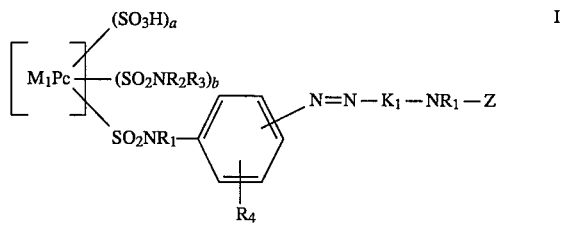

and salts thereof, or a mixture of such compounds or salts, in which

Pc is the phthalocyanine radical, $M_1$ is Cu, Ni, Co, Fe or Al;

a is 1, 2 or 3, b is 0, 1 or 2, provided that the sum of a and b is a maximum of 3;

each $R_1$ is independently hydrogen, unsubstituted $C_{1-4}$alkyl or $C_{1-4}$alkyl monosubstituted by hydroxy, halogen, —$SO_3H$, —$OSO_3H$ or —COOH, each of $R_2$ and $R_3$ is independently hydrogen or $C_{1-6}$alkyl, or $R_2$ and $R_3$ together form a $C_{1-4}$alkylene chain which may be interrupted by —O— or —NH—, $R_4$ is hydrogen, halogen, hydroxy, $C_{1-4}$alkyl, $C_{1-4}$alkoxy, —COOH or —$SO_3H$, Z is

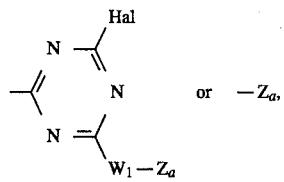 or —$Z_a$,

Hal is fluoro or chloro, $Z_a$ is a fluoro-containing pyrimidinyl radical of the formulae

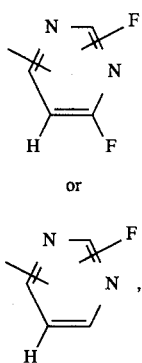

$W_1$ is —$NR_1$—$B_1$—$NR_1$—,

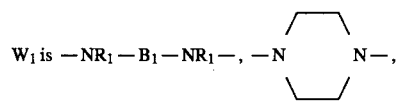

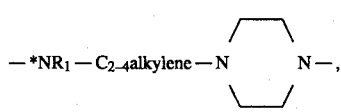

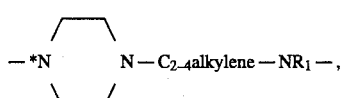

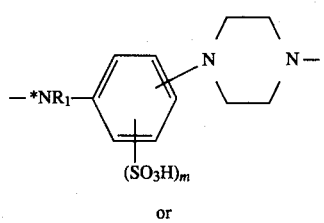

or

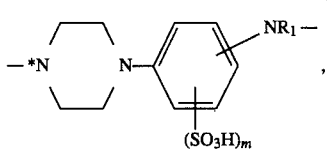

in which
m is 0 or 1, and the marked nitrogen atom is attached to a carbon atom of the triazine ring, $B_1$ is $C_{2-4}$alkylene; —$C_{2-3}$alkylene-Q—$C_{2-3}$alkylene- in which Q is —O— or —$NR_1$—; $C_{3-4}$alkylene monosubstituted by hydroxy;

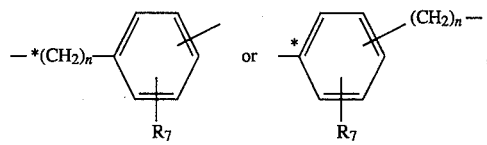

in which the marked carbon atom is attached to the —$NR_1$-radical which is bound to a carbon atom of the triazine ring, n is 0 or an integer 1 to 4, and each $R_7$ is independently hydrogen, halogen, $C_{1-4}$alkyl, $C_{1-4}$alkoxy, —COOH or —$SO_3H$;

$K_1$ is

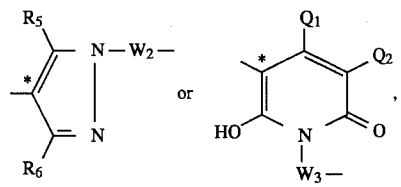 

in which the marked carbon atom indicates the coupling position, $R_5$ is —OH or —$NH_2$, $R_6$ is $C_{1-4}$alkyl or —$COR_8$, each $R_8$ is independently —OH, —$OC_{1-4}$alkyl or —$NH_2$, $W_2$ is a divalent bridging group, $Q_1$, is hydrogen; $C_{1-4}$alkyl; $C_{5-6}$cycloalkyl; phenyl or phenyl which is substituted by 1 to 3 substituents selected from $C_{1-4}$alkyl, $C_{1-4}$alkoxy, halogen, —COOH and —$SO_3H$; phenyl($C_{1-4}$alkyl) or phenyl($C_{1-4}$alkyl) the phenyl ring of which is substituted by 1 to 3 substituents selected from $C_{1-4}$alkyl, $C_{1-4}$alkoxy, halogen, —COOH and —$SO_3H$; —$COR_8$; —$C_{1-4}$alkylene-$SO_3H$; —$C_{1-4}$alkylene—$OSO_3H$ or —$C_{1-4}$alkylene-$COR_8$, $Q_2$ is hydrogen; —CN; —$SO_3H$; —$COR_8$; $C_{1-4}$alkyl; $C_{1-4}$alkyl monosubstituted by —OH, halogen, —CN, $C_{1-4}$alkoxy,

$SO_3H$, —$OSO_3H$ or —$NH_2$; —$SO_2NH_2$;

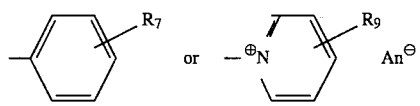

in which
$R_7$ is as defined above,
$R_9$ is hydrogen, $C_{1-4}$alkyl or $C_{1-4}$hydroxyalkyl and
$An^\ominus$ is a non-chromophoric anion; and $W_3$ has one of the significances of $B_1$, but independent thereof, in which the marked carbon atom is attached to the nitrogen atom of the pyridone ring, or —$W_3$—$NR_1$—Z is

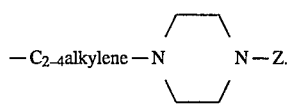

2. A compound according to claim 1, in which $M_1$ is Cu, Ni or Al.

3. A compound according to claim 2, in which each $R_1$ is $R_{1a}$, where each $R_{1a}$ is independently hydrogen, methyl, ethyl, $C_{2-3}$hydroxyalkyl, $-(CH_2)_pSO_3H$, $-(CH_2)_pOSO_3H$ or $-(CH_2)_qCOOH$ in which p is 1 or 2 and q is 1, 2 or 3.

4. A compound according to claim 2, in which each of $R_2$ and $R_3$ is $R_{2a}$ and $R_{3a}$, where each of $R_{2a}$ and $R_{3a}$ is independently hydrogen or $C_{1-4}$alkyl; or $R_{2a}$ and $R_{3a}$ together with the nitrogen atom to which they are bound form a pyrrolidine-, piperidine-, morpholine- or piperazine-ring.

5. A compound according to claim 2, in which $R_4$ is $R_{4a}$, where $R_{4a}$ is hydrogen, methyl, methoxy, $-COOH$ or $-SO_3H$.

6. A compound according to claim 2, in which Z is Z', where Z' is

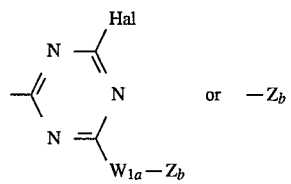

in which

Hal is fluoro or chloro, $W_{1a}$ is $-NR_{1b}-B_{1a}-NR_{1b}-$,

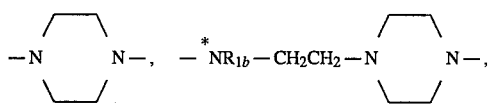

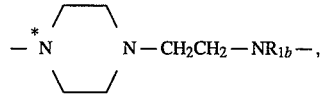

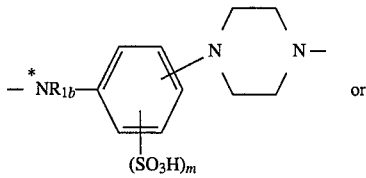

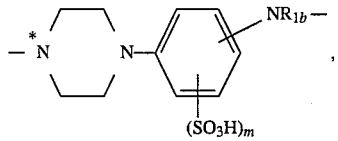

in which each $R_{1b}$ is independently hydrogen, methyl, ethyl, or 2-hydroxyethyl, m is 0 or 1, the marked nitrogen atom is bound to a carbon atom of the triazine ring, and $B_{1a}$ is $C_{2-3}$alkylene, $-CH_2CH_2-$ $NR_{1b}CH_2CH_2-$, monohydroxy-substituted $C_{3-4}$alkylene,

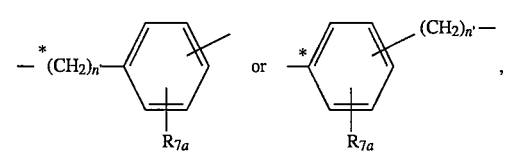

wherein n' is 0 or 1, $R_{7a}$ is hydrogen, chloro, methyl, methoxy, $-COOH$ or $-SO_3H$, and the marked carbon atom is attached to the $-NR_{1b}$-radical which is bound to a carbon atom of the triazine ring, and $Z_b$ is a radical (a), ($b_1$) or ($b_2$)

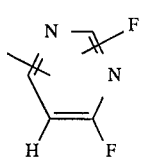 (a)

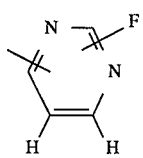 ($b_1$)

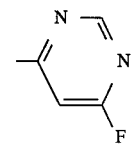 ($b_2$)

7. A compound according to claim 6, in which $K_1$ is $K_{1a}$, where $K_{1a}$ has the formula

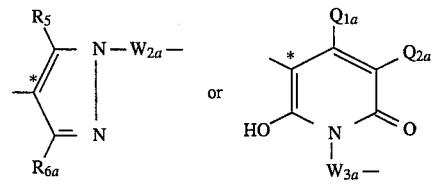

in which the marked carbon atom indicates the coupling position, $R_5$ is $-OH$ or $-NH_2$, $R_{6a}$ is methyl, $-COOH$ or $-CONH_2$, $W_{2a}$ is

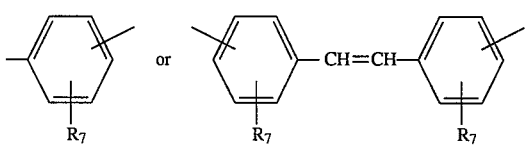

in which each $R_7$ is independently hydrogen, halogen, $C_{1-4}$alkyl, $C_{1-4}$alkoxy, $-COOH$ or $-SO_3H$, $Q_{1a}$ is hydrogen, methyl, ethyl, phenyl, $-COR_{8a}$, $-CH_2SO_3H$ or $-CH_2OSO_3H$, $Q_{2a}$ is hydrogen, $-CN$, $-SO_3H$, $-COR_{8a}$ or —CH$_2$SO$_3$H, in which each R$_{8a}$ is independently —OH or —NH$_2$, and W$_{3a}$ is C$_{2-4}$alkylene, monohydroxy-substituted C$_{3-4}$alkylene,

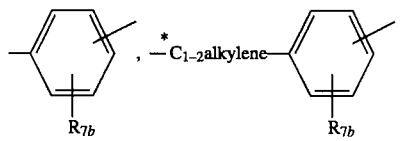

or

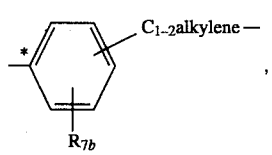

in which

R$_{7b}$ is hydrogen or —SO$_3$H, and the marked carbon atom is attached to the nitrogen atom of the pyridone ring.

8. A compound according to claim 1, which corresponds to formula Ia

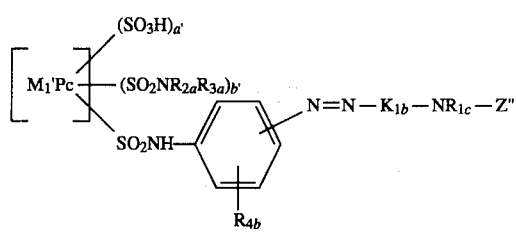  Ia and salts thereof, or a mixture of such compounds or salts, in which M$_1$' is Cu or Ni, a' is 2 or 3, b' is 0 or 1, provided that the sum of a' and b' is a maximum of 3, each of R$_{2a}$ and R$_{3a}$ is independently hydrogen or C$_{1-4}$alkyl; or R$_{2a}$ and R$_{3a}$ together with the nitrogen atom to which they are bound form a pyrrolidine-, piperidine-, morpholine- or piperazine-ring, R$_{1c}$ is hydrogen or methyl, R$_{4b}$ is hydrogen, —COOH or —SO$_3$H, K$_{1b}$ has the formula

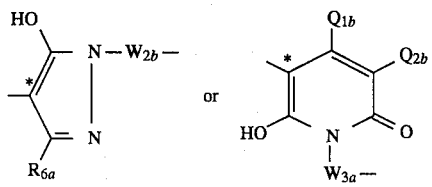

in which

R$_{6a}$ is methyl, —COOH or —CONH$_2$, W$_{2b}$ is

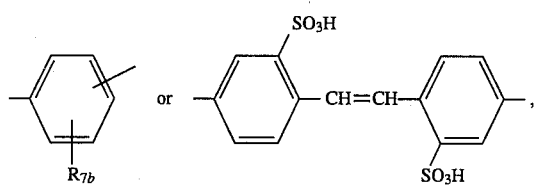

wherein

R$_{7b}$ is hydrogen or —SO$_3$H,

Q$_{1b}$ is methyl or ethyl,

Q$_{2b}$ is hydrogen or —CONH$_2$, and

W$_{3a}$ is C$_{2-4}$alkylene, monohydroxy-substituted C$_{3-4}$alkylene,

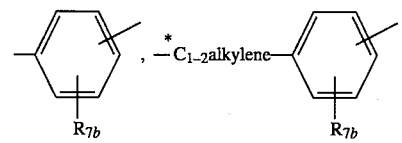

or

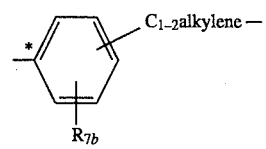

in which R$_{7b}$ independently is as defined above, and the marked carbon atom is attached to the nitrogen atom of the pyridone ring, and Z" is

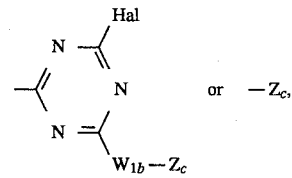

wherein

Hal is fluoro or chloro,

W$_{1b}$ is —NR$_{1b}$—B$_{1b}$—NR$_{1b}$— or

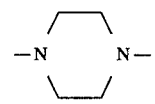

in which each R$_{1b}$ is independently hydrogen, methyl, ethyl or 2-hydroxyethyl, B$_{1b}$ is C$_{2-3}$alkylene, —CH$_2$CH$_2$—NR$_{1b}$—CH$_2$CH$_2$—, —CH$_2$CH(OH)CH$_2$— or

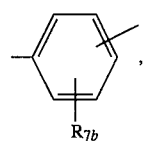

wherein $R_{7b}$ independently is as defined above, and $Z_c$ is a radical (a)

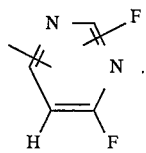

9. A compound according to claim 8, in which a' is 2 or 3 and b' is 0; and Z" is Z''', where Z''' is

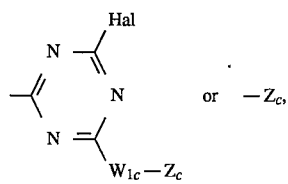

wherein

Hal and $Z_c$ are as defined in claim 8, and $W_{1c}$ is —NH—$B_{1c}$—NH—, in which $B_{1c}$ is —CH$_2$CH$_2$—, —CH$_2$CH$_2$CH$_2$— *CH$_2$CH(CH$_3$)— or —CH$_2$CH(OH)CH$_2$—, wherein the marked carbon atom is bound to the —NH-radical which is attached to a carbon atom of the triazine ring.

10. A process for dyeing or printing a hydroxy group- or nitrogen-containing organic substrate comprising applying to the substrate a compound of formula I defined in claim 1, or a mixture thereof.

* * * * *